(12) United States Patent
Chen et al.

(10) Patent No.: US 7,577,969 B2
(45) Date of Patent: Aug. 18, 2009

(54) ANTISTATIC STRUCTURE FOR OPTICAL DISC DEVICE

(75) Inventors: Jung Fu Chen, Hsinchu (TW); In Shuen Lee, Hsinchu (TW); Chun Jen Tseng, Hsinchu (TW); Chih Chung Hsieh, Hsinchu (TW); Jeng Wen Huang, Hsinchu (TW)

(73) Assignee: Lite-On It Corporation, Taipei (TW)

( * ) Notice: Subject to any disclaimer, the term of this patent is extended or adjusted under 35 U.S.C. 154(b) by 216 days.

(21) Appl. No.: 11/165,136

(22) Filed: Jun. 24, 2005

(65) Prior Publication Data

US 2006/0212891 A1  Sep. 21, 2006

(30) Foreign Application Priority Data

Mar. 17, 2005  (TW) .............................. 94108238 A (51) Int. Cl.
*G11B 7/00*  (2006.01)
(52) U.S. Cl. ..................................................... 720/689
(58) Field of Classification Search .................. 720/689, 720/650, 601
See application file for complete search history.

(56) References Cited

U.S. PATENT DOCUMENTS

| | | | | |
|---|---|---|---|---|
| 5,684,775 A | * | 11/1997 | Tanaka et al. ............... | 720/650 |
| 5,808,996 A | * | 9/1998 | Aoyama ...................... | 720/651 |
| 5,892,651 A | * | 4/1999 | Arai ............................ | 361/221 |
| 6,388,980 B2 | * | 5/2002 | Otani et al. .................. | 720/603 |
| 6,947,355 B2 | * | 9/2005 | Hong et al. .............. | 369/30.27 |
| 7,137,131 B2 | * | 11/2006 | Park et al. ................... | 720/650 |
| 2004/0111732 A1 | * | 6/2004 | Park et al. ................... | 720/650 |
| 2005/0198659 A1 | * | 9/2005 | Ahn et al. .................... | 720/650 |
| 2006/0221801 A1 | * | 10/2006 | Eberdorfer ............. | 369/124.01 |

* cited by examiner

*Primary Examiner*—Angel A Castro
(74) *Attorney, Agent, or Firm*—Muncy, Geissler, Olds & Lowe, PLLC (57) ABSTRACT

The present invention relates to an antistatic structure for an optical disc device. An optical pick-up unit module of an optical disk device is installed on a chassis and the chassis is movably installed in a lower cover of the device. Furthermore, the antistatic structure includes at least one upper connecting portion capable of contacting with the optical pick-up unit module and at least one lower connecting portion capable of contacting with the lower cover. Whereby, the static electricity generated by the optical pick-up unit module can be conducted to the lower cover through the upper and lower connecting portions so as to attain the antistatic discharge (ESD) protection effectively.

15 Claims, 9 Drawing Sheets

ANTISTATIC STRUCTURE FOR OPTICAL DISC DEVICE

This Non-provisional application claims priority under 35 U.S.C. §119(a) on Patent Application No(s). 094108238 filed in Taiwan, Republic of China on Mar. 17, 2005, the entire contents of which are thereby incorporated by reference.

1. Field of the Invention

The present invention relates to an antistatic structure, and more particularly to an antistatic structure for an optical disc device.

2. Description of Related Art

With the arrival of the information age, an optical disc device has already developed mature gradually. However, in an optical pick-up unit module used in optical disc devices, many components such as a spindle motor M1, pick-up unit P and stepping motor for driving the optical pick-up unit P all have a possibility to generate static electricity so that the a system is apt to be unstable, even to crash or power failure thereof is easy to happen. For this reason, the optical disc device must pass an electrostatic discharge (ESD) protection test so as to avoid influencing the disc reading quality of the device attributed to the static electricity.

However, to the current antistatic structure of an optical disc device, the current industries all adopt a design tendency to allow components therein to get in touch with one another to conduct the generated statistic electricity out from the device to attain the antistatic purpose effectively.

Figure 1:
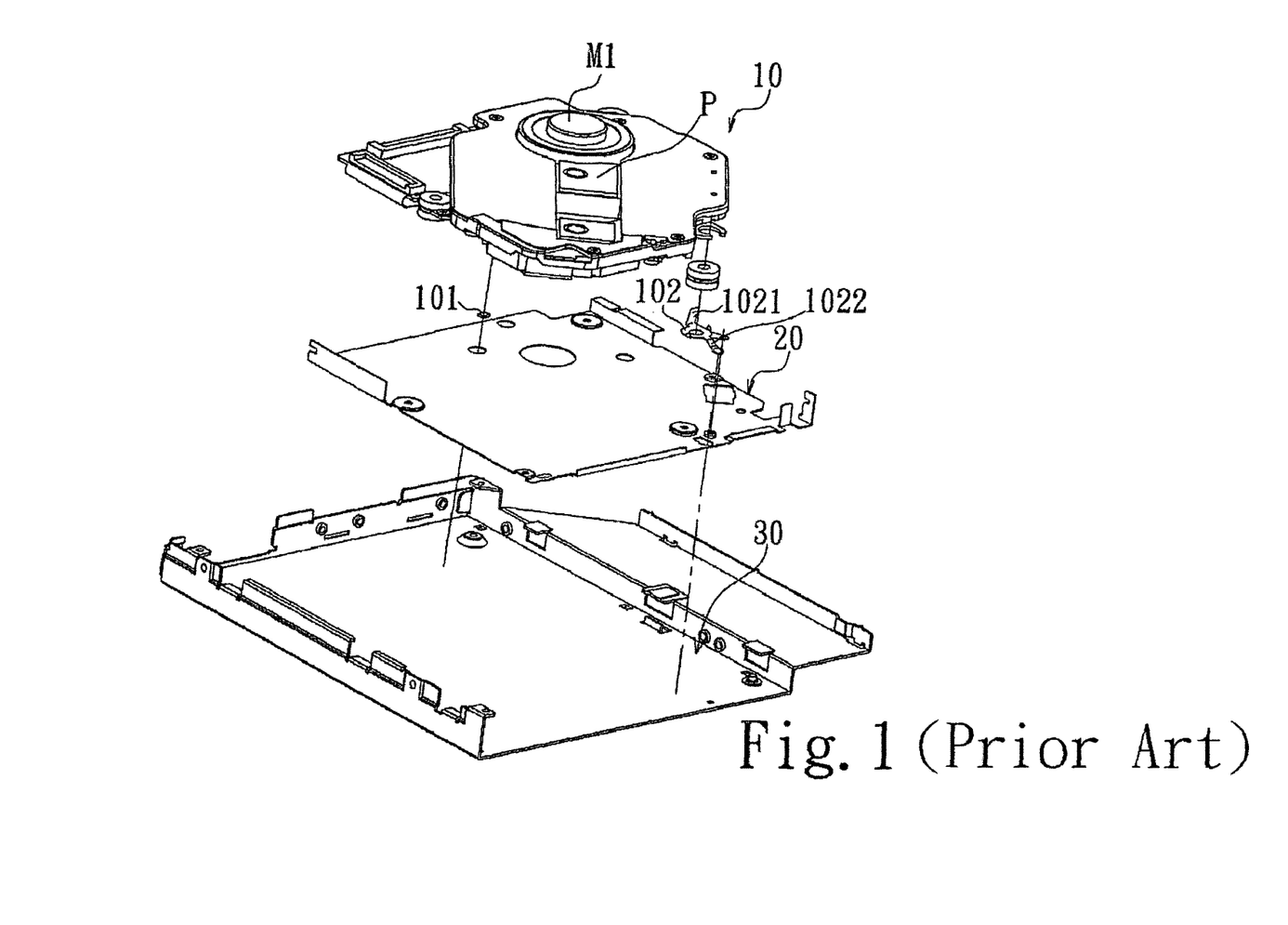
FIG. 1 is prospective top view, showing a conventional antistatic structure in an optical disc device.
Figure 2:
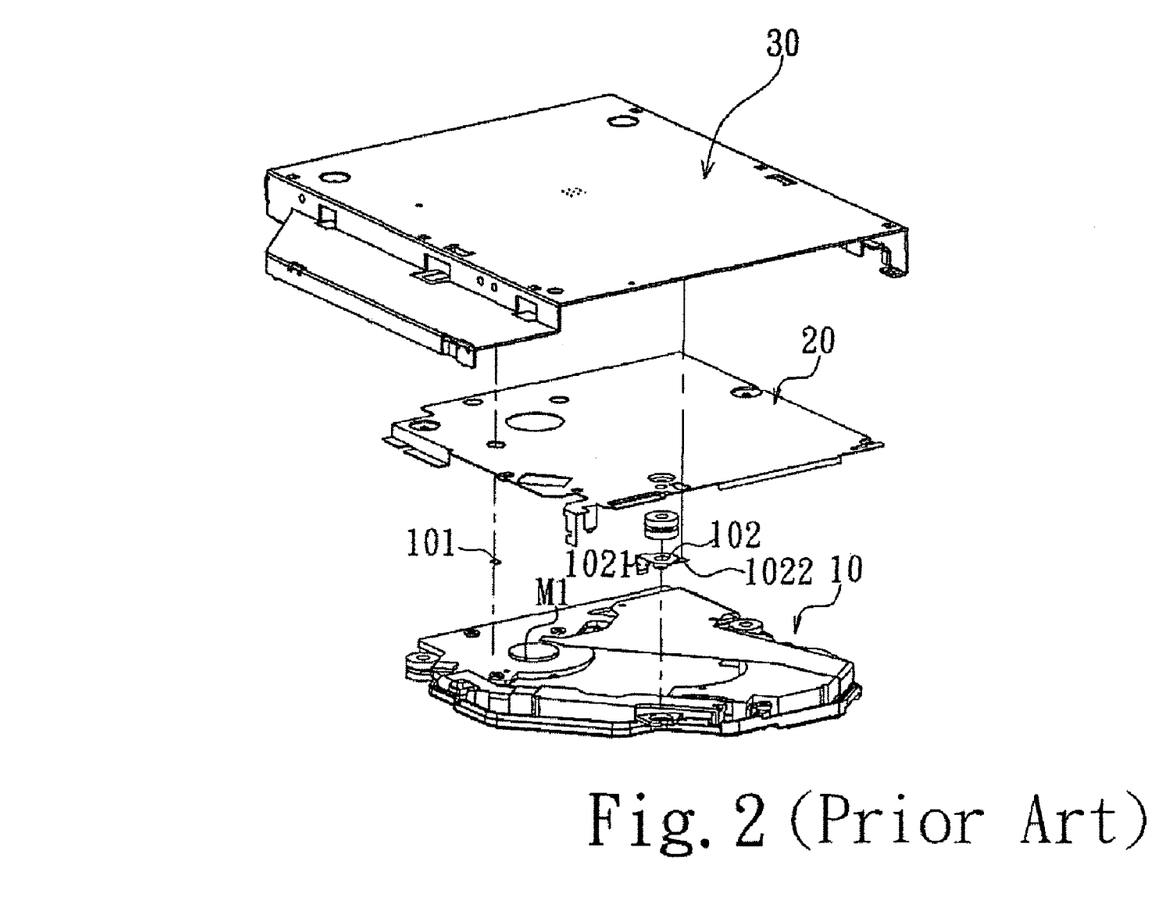
FIG. 2 is a prospective bottom view, showing the convention antistatic structure shown in FIG. 1.

Please refer to FIGS. 1 and 2 both of which show a conventional antistatic structure in an optical disc device. An optical disc device generally comprises an optical pick-up unit module 10 installed with a spindle motor M1, pick-up unit P and stepping motor (not shown in the figure); a chassis 20 for shielding and protecting the components of the optical pick-up unit module 10; and a lower cover 30 allowing the chassis 20 to be capable of sliding on the surface thereof. The way adopted by the industry to discharge the static electricity on the optical pick-up unit module 10 attributed to the spindle motor M, the pick-up unit P and the stepping motor is mainly to add a conductive foam 101 and a metal plate 102 which are capable of communicating the optical pick-up unit module 10 with the lower cover 30, as FIG. 2 shows. The metal plate 102 is located between the optical pick-up unit module 10 and the chassis 20 and respectively extended with an upper and a lower elastic sheets 1021 and 1022; the upper elastic sheet 1021 contacts with the optical pick-up unit module 10, while the free end of the lower elastic sheet 1022 directly contacts with the lower cover 30 via the opening disposed in the chassis 20 to allow the optical pick-up unit module 10 and the lower cover 30 conducting with each other so as to conduct the static electricity generated from the optical pick-up module 10 out from the device to attain the purpose of anti-static function.

However, such a design would increase the number of components and the production costs. Besides, since the entire mechanism consisting of the optical pick-up unit module 10 and chassis 20 is designed to slide and move on the lower cover 30, the lower elastic sheet 1022 leaves and slides on the surface of the lower cover 30 over and over again. The end of the lower elastic sheet 1022 connected with the metal plate 102 is caused to fatigue resulting in forever deformation so that it cannot get in touch with the lower cover 30 to maintain the grounding effect.

Furthermore, such a design is unable to conduct the static electricity generated from the optical pick-up unit module 10 effectively; the reason is that the matching of the optical pick-up unit module 10 and the pick-up unit P must be particularly considered so as to prevent from the interference phenomenon generated upon the installment of the spindle motor M1. But, this will cause the static electricity generated on the spindle motor M1 not be communicated or badly communicated with the metal sheet 102 installed on the optical pick-up unit module 10.

For this reason, a conductive foam 101 is further attached onto the surface of the spindle motor M1 to connect the spindle motor M1 with the chassis 20 for conducting the generated static electricity from the spindle motor M1. Therefore, the conventional antistatic structure is not an ideally designed structure.

Hence, the present invention is intended to resolve how to reduce the number of components in an antistatic structure for a disc device and reduce the production cost and that the static electricity is effectively conducted out from the device.

SUMMARY OF THE INVENTION

One object of the present invention is to provide an antistatic structure for an optical disc device, capable of reducing the number of components so as to attain to the best antistatic effect.

For achieving the object mentioned above, the present invention proposes an antistatic structure for an optical disc device. An optical pick-up unit module of an optical disc device is installed on a chassis and the chassis is movably installed in a lower cover. The antistatic structure is installed on the chassis and includes at least one upper connection portion and at least one lower connection portion. The upper connection portion contacts with the optical pick-up unit module and the lower connection portion contacts with the lower cover; thereby the static electricity generated on the optical pick-up unit module is smoothly conducted to the lower cover through the upper and the lower connection portions so as to effectively attain the antistatic protection object.

According to the antistatic structure of the preferred embodiment of the present invention, the upper connection portion got in touch with the optical pick-up unit module is directly formed by stamping on the surface of the chassis so as to form at least one connecting arm integrated with the chassis, and the upper connection portion contacts with the optical pick-up unit module through a free end of the arm.

Besides, the upper connection portion installed on the chassis can be directly correspondingly got in touch with the relative components on the optical pick-up unit module, such as a turntable to allow the static electricity generated by the components on the module to be conducted directly to the chassis through the upper connection portion without by means of the transmission of another component so as to allow the statistic generated by the relative components of the optical pick-up unit module being transmitted smoothly to the chassis.

According to the preferred embodiment of the present invention, the front end of the upper connection portion is bended in an angle to allow the area of the front end contacting with the optical pick-up unit module being effectively increased.

According to the preferred embodiment of the present invention, the upper connection portion is flexible so that the upper connection portion can closely contact with the surface of the optical pick-up unit module by means of the flexibility thereof when the chassis and the optical pick-up unit module are assembled together.

According to the antistatic structure of the preferred embodiment of the present invention, the lower connection portion got in touch with the chassis is installed facing the surface of the lower cover and a flexible lower connecting arm is also installed on the lower connection portion toward the lower cover.

Furthermore, the front end of the lower connecting arm is bended upward in an angle to form a guide inclined plane. Thus when the lower connecting arm is got in touch with the rim of the lower cover, the lower connecting arm is deformed elastically through the guide inclined plane at the front end thereof and then contacts with the lower cover.

According to the present invention, the main purpose to dispose the upper and the lower connection portions on the chassis is that the optical pick-up unit module and the lower cover are allowed to form an electric conduction to cause the static electricity to be conducted out from the device. Therefore, the antistatic structure according to the present invention is not limited to an integrated formed connecting arm, as long as the structure is electric conductive with the lower cover or the optical pick-up unit module.

Furthermore, the lower connection portion of the antistatic structure of one preferred embodiment according to the present invention is a crossbeam disposed in the chassis. A protrusion capable of touching with the lower cover is disposed on the crossbeam. The crossbeam and the protrusion can be formed on the chassis by stamping.

Furthermore, the protrusion and the rim of the lower cover are in an interference state so as to control the timely deformation effectively to allow the protrusion can contact with the surface of the lower cover continuously when the optical pick-up unit module is slid in the lower cover.

BRIEF DESCRIPTION OF THE DRAWINGS

The present invention can be more fully understood by reference to the following description and accompanying drawings, in which.

DETAILED DESCRIPTION OF THE PREFERRED EMBODIMENTS

Figure 3:
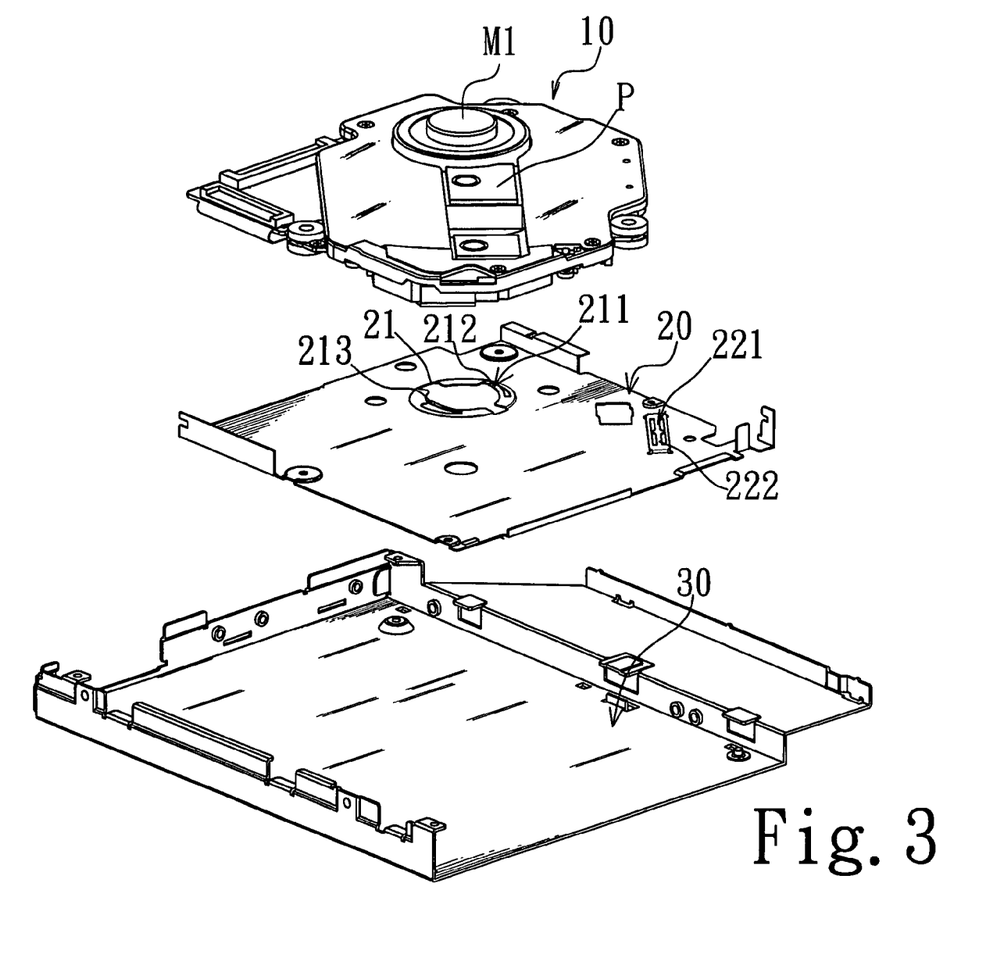
FIG. 3 is a prospective top view, showing an antistatic structure of one preferred embodiment according to the present invention.
Figure 4:
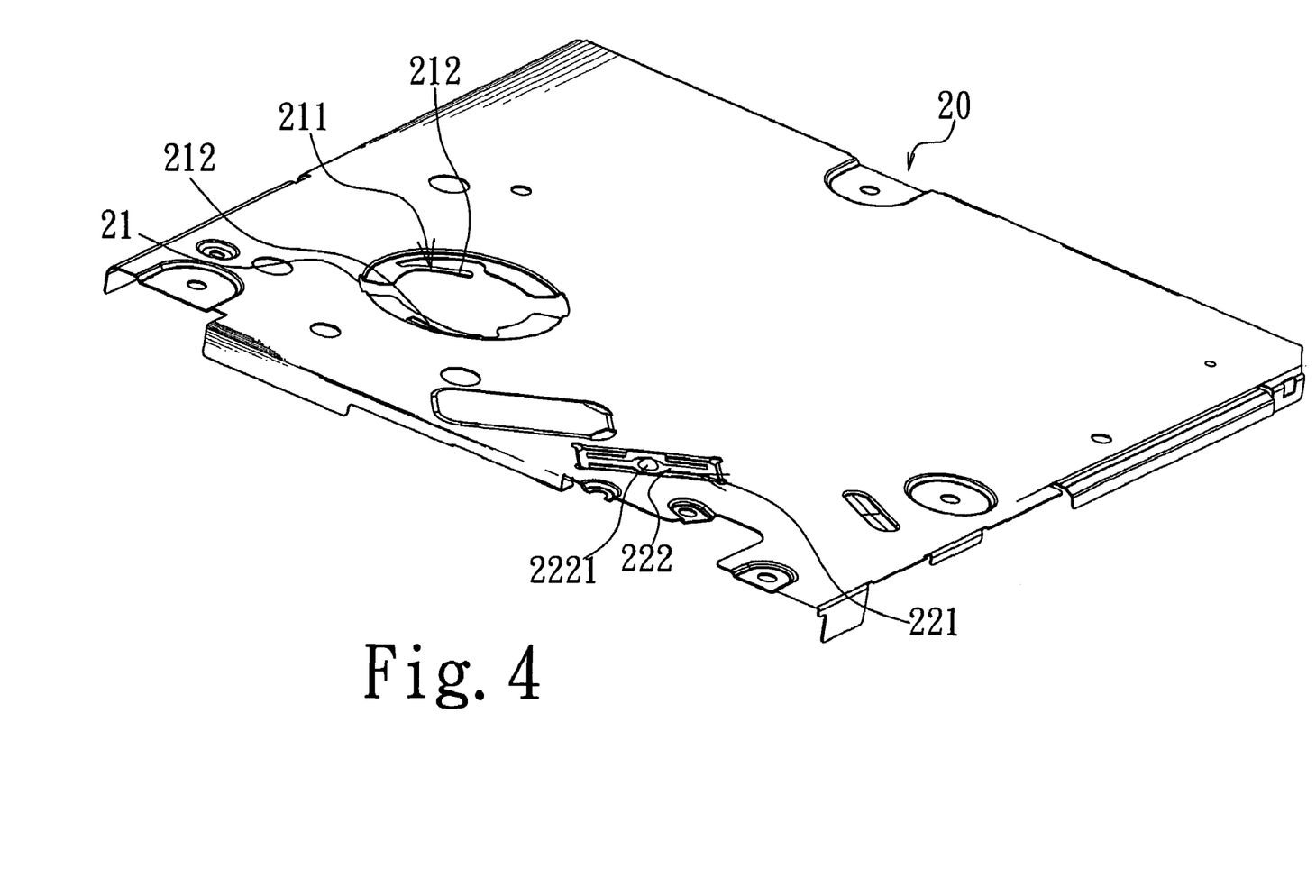
FIG. 4 is a prospective bottom view, showing the chassis in the antistatic structure shown in FIG. 3.

Please refer to FIGS. 3 and 4. FIG. 3 is a prospective top view, showing an antistatic structure of one preferred embodiment according to the present invention; and FIG. 4 is a prospective bottom view, showing the chassis in the antistatic structure shown in FIG. 3. An antistatic structure of an optical disk device of one preferred embodiment according to the present invention is installed on a chassis 20 which is used to shield and protect an optical pick-up unit module 10 to allow the optical pick-up unit module 10 to be electrically conductive with a lower cover 30.

The antistatic structure comprises at least one flexible upper connection portion 211 and at least one flexible lower connection portion 221; in which the upper connection portions 211 are disposed at the inside of a through hole 21 on the chassis 20 and each of which has an upper connecting arm 212 extending from the rim of the through hole 21 in a direction toward the optical pick-up unit module 10. A free end 213 of the upper connecting arm 212 contacts with the optical pick-up unit module 10 to allow the static electricity generated therein to be conducted to the chassis 20. Besides, the free end 213 of the upper connecting arm 212 is bended in an angle downward so as to increase the contact area of the upper connecting arm 212 with the optical pick-up unit module 10. Furthermore, because the upper connecting arm 212 is flexible, it is closely got in touch with the optical pick-up unit module 10 due to the flexibility when the chassis 20 and the optical pick-up unit module 10 are assembled together.

Besides, the position of each upper connection portion 211 disposed on the chassis 20 is selected depending on the corresponding position of the component to be contacted; for example, a component which is installed on the optical pick-up unit module 10 and is uneasy to conduct the static electricity to the optical pick-up unit module 10, such as the spindle motor M1, can conduct the generated static electricity directly into the chassis 20 by contacting it with the upper connection portion 211. Therefore, the number of the upper connection portions 211 is varied depending on the components to be contacted. In this embodiment, the upper connection portions 211 are positioned below the spindle motor M1 and contact with the spindle motor M1 so as to conduct the static electricity generated in the spindle motor M1 to the chassis 20.

In this embodiment, the lower connection portion 221 is a crossbeam 222 disposed on the chassis 20; the both ends of the crossbeam 222 are kept connecting integrated with the chassis 20. A protrusion 2221, which contacts with the lower cover 30, is disposed on the surface of the crossbeam 222 toward the lower cover 30 and is used for conducting the static electricity to the chassis 20 further to the lower cover 30 so that the optical pick-up unit module 10 is electrically conductive with the lower cover 30. Whereby, the number of the components in an optical disk device can be reduced and the production cost can be lowered down.

According to the antistatic structure of the present invention, because the chassis 20 is a thin metal plate, the upper and the lower connection portions 211 and 221 can be formed integrated on the metal plate surface by stamping. But, the upper and the lower connection portions 211 and 222 in the present invention are not limited to this.

Figure 5:
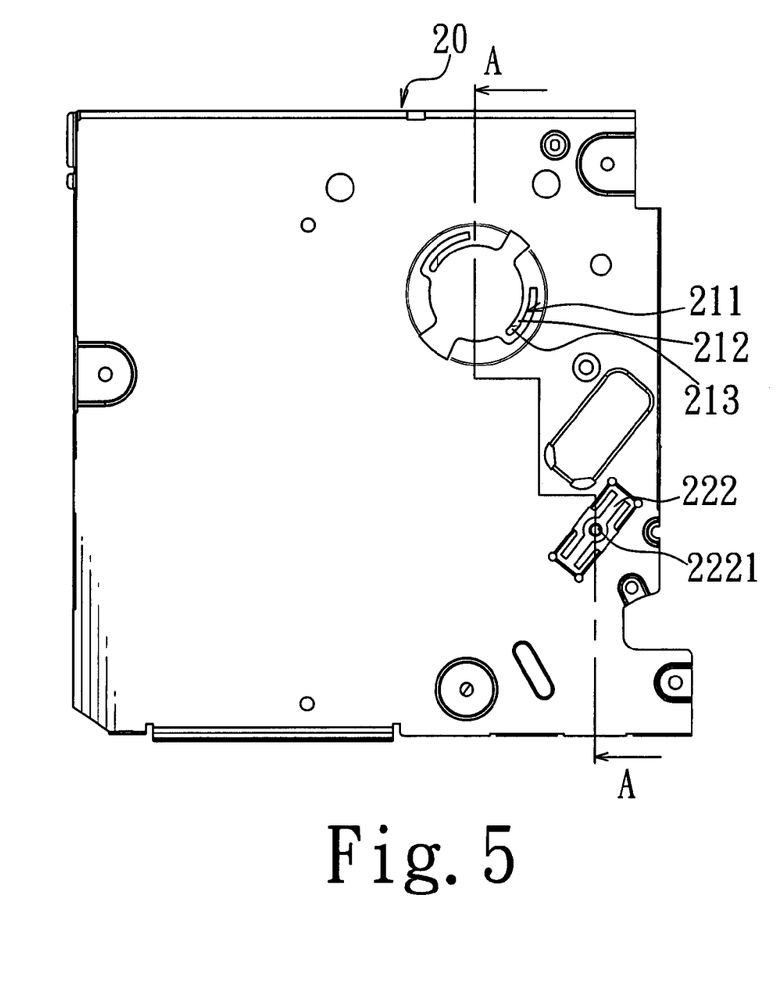
FIG. 5 is a top plane view, showing the chassis in the antistatic structure shown in FIG. 3.
Figure 6:
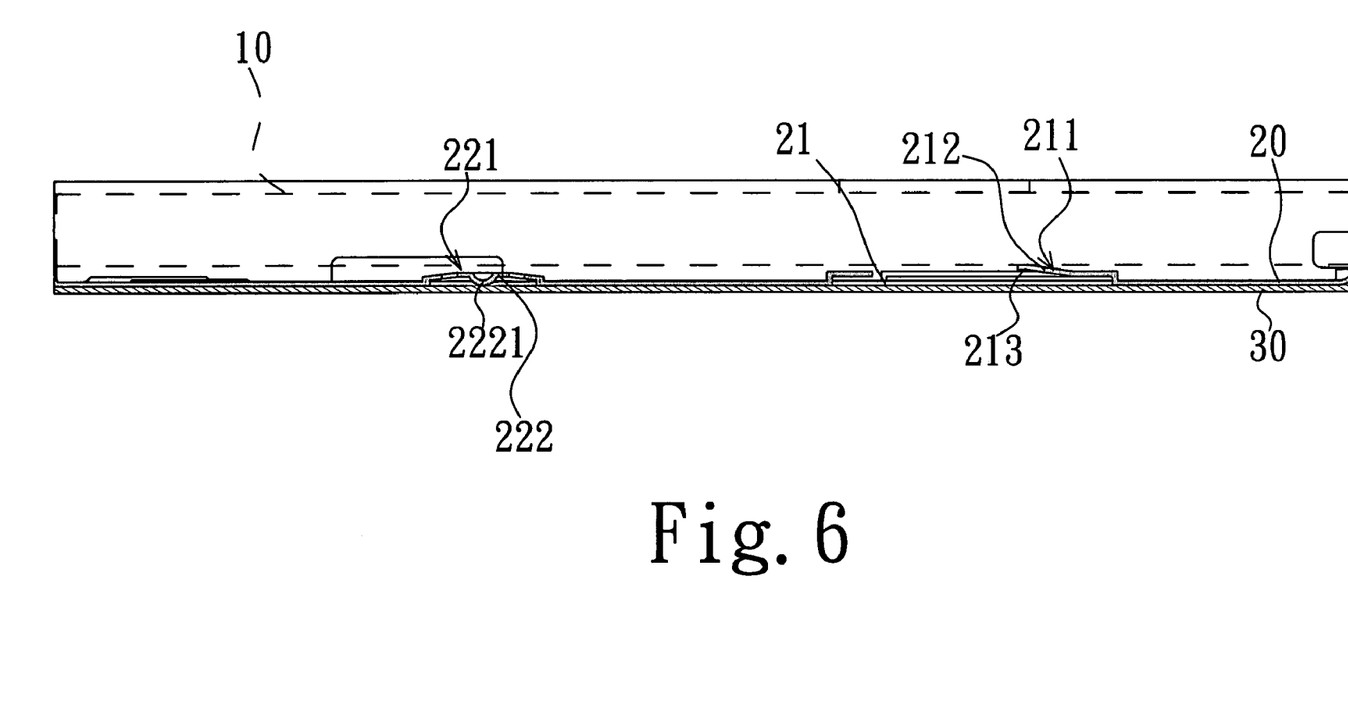
FIG. 6 is a cross-section view, showing the chassis shown in FIG. 5 along the line A-A, in which the chassis is carried in the lower cover.

Please refer to FIGS. 5 and 6. FIG. 5 is a top plane view, showing the chassis in the antistatic structure shown in FIG. 3; and FIG. 6 is a cross-section view, showing the chassis shown in FIG. 5 along the line A-A, in which the chassis is carried in the lower cover. When the optical pick-up unit module 10 is assembled into the chassis 20, the upper connection portion 211 disposed on the chassis 20 is got in touch with the optical pick-up unit module 10, and when the chassis 20 is assembled into the lower cover 30, the lower connection portion 221 disposed on the chassis 20 is got in touch with the lower cover 30. The chassis 20 originally only used for shielding and protecting the parts in the optical pick-up unit module 10 can be used to conduct the static electricity generated on the optical pick-up unit module 10 smoothly to the lower cover 30 via the upper connection portion 211 and the lower connection portion 221 installed on the chassis 20. This can allow the static electricity generated by the components in the optical pick-up unit module to be conducted out smoothly to attain a grounding effect.

Figure 7:
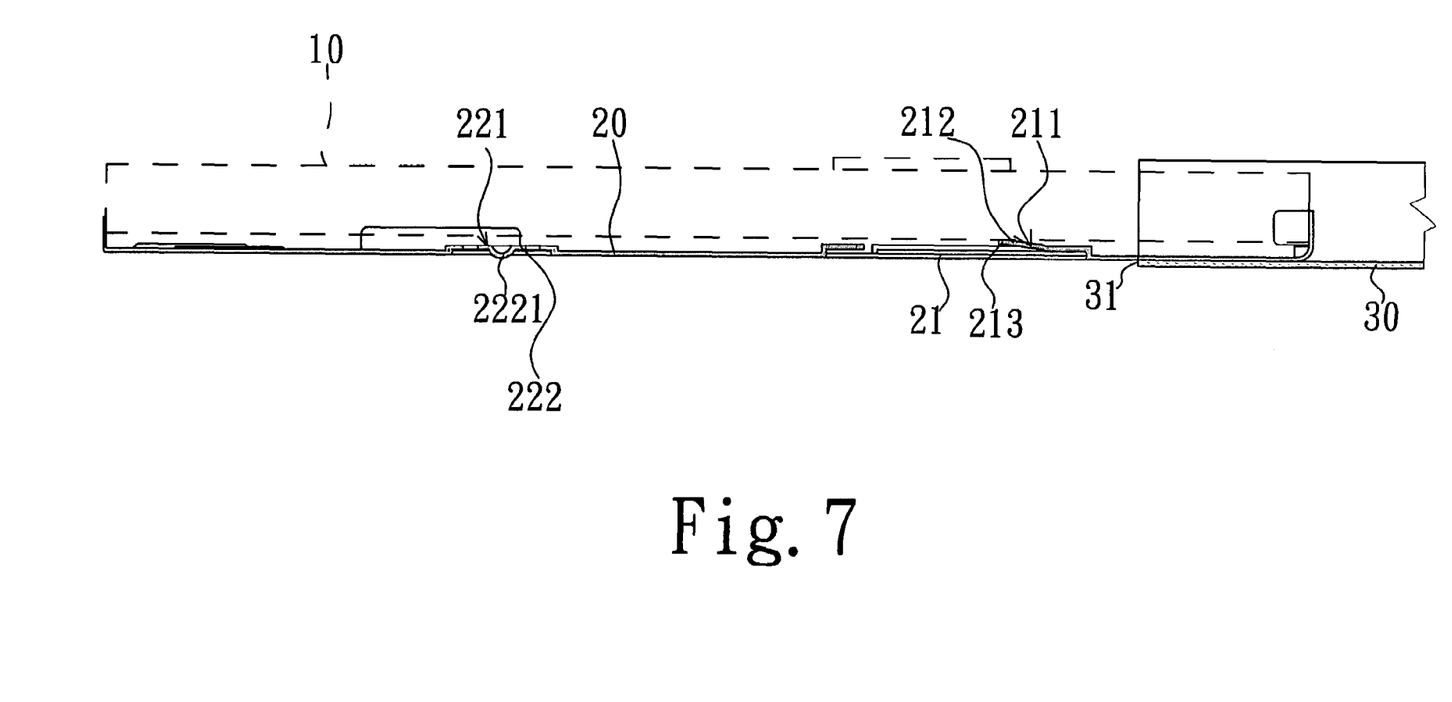
FIG. 7 is another schematic view showing a cross-sectional view along line A-A of the chassis in FIG. 5, in which the chassis is carried out from the lower cover.
Figure 8:
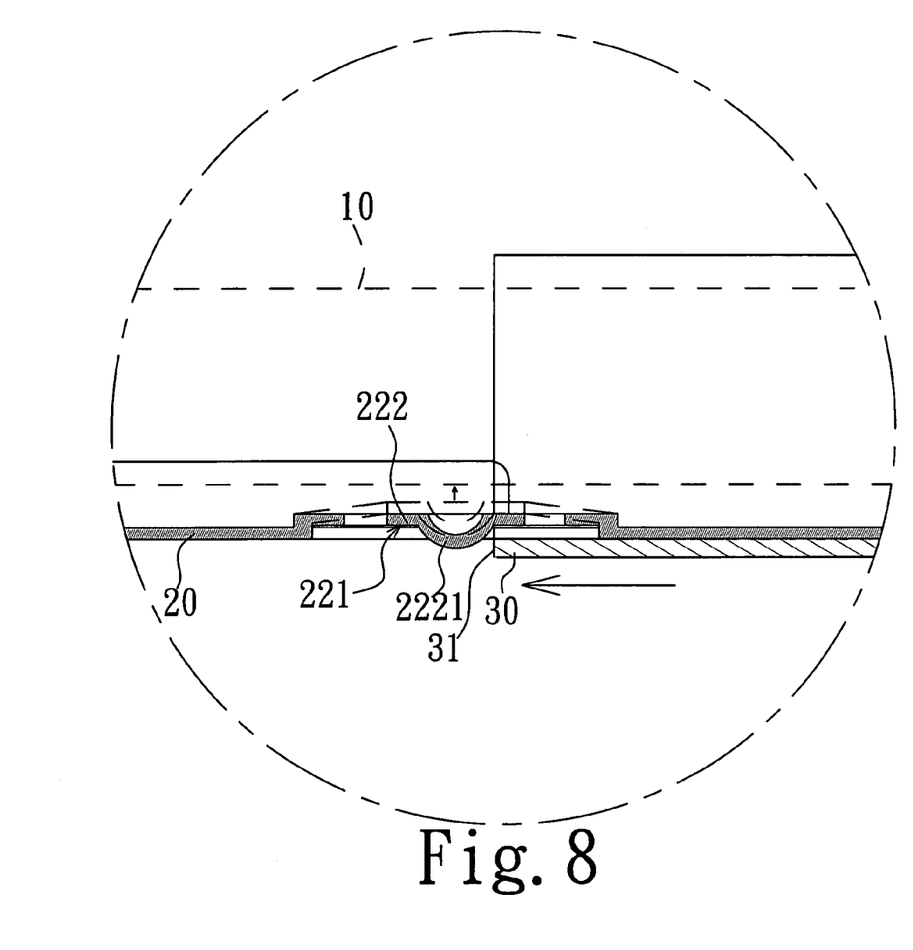
FIG. 8 is an enlarge cross-section view, showing the interference state between the lower cover and the lower connecting portion in the present antistatic structure, in which the lower connection portion is in the form of a protrusion.

Please refer to FIGS. 7 and 8. FIG. 7 is another schematic view showing a cross-sectional view along line A-A of the chassis in FIG. 5, in which the chassis is carried out from the lower cover; and FIG. 8 is an enlarging cross-section view, showing the interference state between the lower cover and the lower connecting portion in the present antistatic structure, in which the lower connection portion is in the form of a protrusion. A slight interference is formed between the lower connection portion 221 and a rim 31 of the lower cover 30 contacted therewith, as FIG. 8 shows. Therefore, when the chassis 20 is slid into the lower cover 30, the crossbeam 222 is deformed upward slightly due to the interference between the protrusion 2221 and the lower cover 30. And then, the chassis 20 is smoothly slid into the lower cover 30 and the protrusion 2221 is continuously kept a contact state with the lower cover 30 through the press down force yielded from the slight deformation of the crossbeam 222. Furthermore, a metal fatigue is not easy to be yielded in the lower connection portion 221 to cause it to be deformed forever due to a long term use because the both ends of the lower connection portion 221 are integrated formed in the chassis 20. Whereby, the grounding effect can be maintained continuously.

Figure 9:
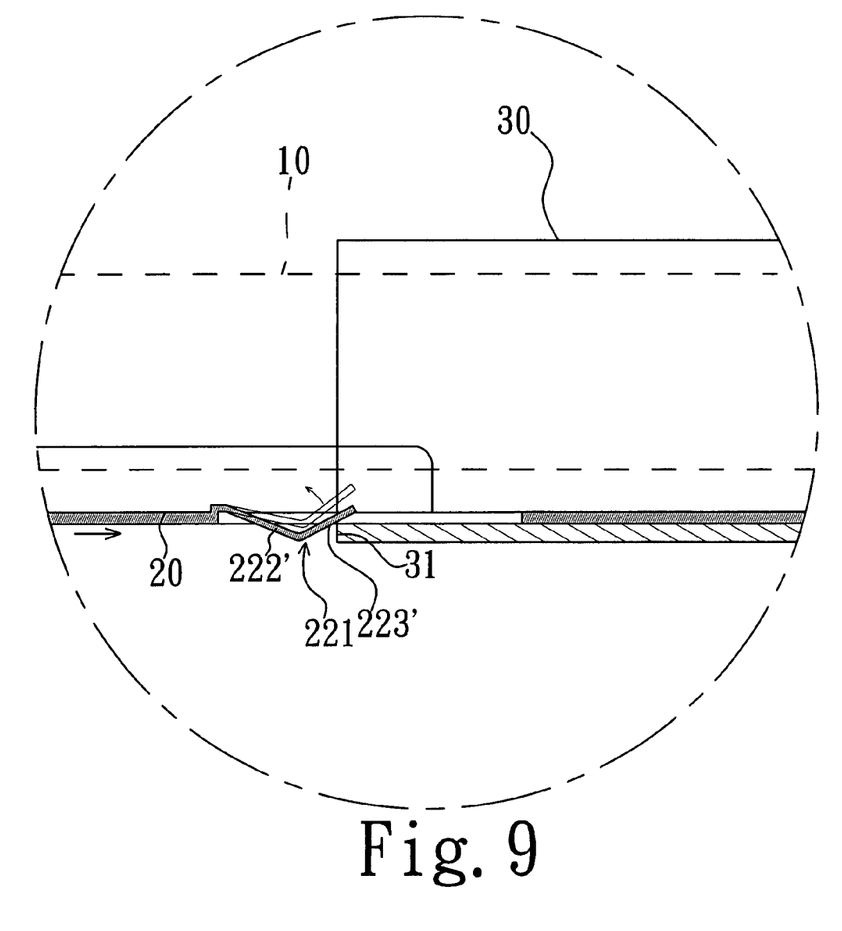
FIG. 9 is an enlarging cross-section view, showing the interference state between the lower cover and the lower connecting portion in the present antistatic structure, in which the lower connection portion is in the form of an arm.

Please refer to FIG. 9. FIG. 9 is a an enlarging cross-section view, showing the interference state between the lower cover and the lower connecting portion in the present antistatic structure, in which the lower connection portion is in the form of an arm. The main purpose for disposing upper and lower connection portions 211 and 221 on the chassis 20 according to the present invention is to form an electric conduction effect between the optical pick-up unit module 10 and the lower cover 30 to allow the static electricity to be conducted out from the device. Therefore, the upper and the lower connection portions 211 and 221 disposed on the chassis 20 are not limited to specific structures, as long as an electric conduction is formed between the lower cover 30 and the optical pick-up unit module 10. For this reason, the lower connection portion 221 is similarly provided with a flexible lower connecting arm 222' toward the lower cover 30 like the upper connection portion 211, as FIG. 9 shows. And, the free end of the lower connecting arm 222' is bended upward in an angle to allow the front end to form an inclined guide plane 223'. The lower connecting arm 222' is caused to deform upward slightly and contact with the surface of the lower cover 30 through the guidance function attributed to the inclined guide plate 223' when interference is happened between the lower connecting arm 222' and the rim 31 of the lower cover 30.

The antistatic structure according to the present invention can conduct the static electricity generated from the optical pick-up unit module effectively to the lower cover to be grounded through the upper and lower portions disposed on the chassis. Therefore the damage of the electric components in the optical disk device caused from the static electricity can be prevented. Besides, the number of assembly components can be reduced by forming the upper and the lower connection portions on the chassis and the assembling cost and time can further be greatly lowered down.

Additional advantages and modifications will be readily made to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An antistatic structure for an optical disk device, said optical disc device having a lower cover and an optical pick-up unit module used to read data stored in an optical disk, said antistatic structure comprising:
    a chassis movably installed in said lower cover and said optical pick-up unit module being disposed on said chassis, in which at least one flexible upper connection portion and at least one flexible lower connection portion are provided on said chassis;
    wherein said upper connection portion contacts with said optical pick-up unit module and said lower connection portion contacts with said lower cover,
    wherein said lower connection portion is a crossbeam on which surface is provided with a protrusion which contacts with said lower cover.

2. The antistatic structure according to claim 1, wherein said upper and lower connection portions are integrated with said chassis.

3. The antistatic structure according to claim 1, wherein said upper connection portion is in the form of an arm which has a free end got in touch with said optical pick-up unit module.

4. The antistatic structure according to claim 3, wherein said free end of said upper connection portion is further bended downward in an angle so as to increase the contact area with said optical pick-up unit module.

5. The antistatic structure according to claim 1, wherein said lower connection portion is in the form of an arm which has a free end got in touch with said lower cover.

6. The antistatic structure according to claim 5, wherein said free end of said lower connection portion is further bended upward in an angle to form an inclined guide plane.

7. The antistatic structure according to claim 1, wherein said protrusion is slightly interfered with a rim of said lower cover.

8. The antistatic structure according to claim 1, wherein said crossbeam and said protrusion are integrated with said chassis.

9. An antistatic structure for an optical disk device, said optical disc device having a lower cover and an optical pick-up unit module used to read data stored in an optical disk, said antistatic structure comprising:
    a chassis slideably installed in said lower cover and said optical pick-up unit module being disposed on said chassis,
    wherein an upper connection portion is formed integrated on said chassis to contact with said optical pick-up unit module and a lower connection portion is formed integrated on said chassis to contact with said lower cover,
    wherein said lower connection portion is a crossbeam on which surface is provided with a protrusion which contacts with said lower cover.

10. The antistatic structure according to claim 9, wherein said upper and lower connection portions are flexible.

11. The antistatic structure according to claim 9, wherein said upper connection portion is in the form of an arm.

12. The antistatic structure according to claim 11, wherein said arm has a free end being bended downward in an angle so as to increase the contact area with said optical pick-up unit module.

13. The antistatic structure according to claim 9, wherein said lower connection portion is in the form of an arm.

14. The antistatic structure according to claim 13, wherein said arm has a free end being bended upward in an angle to form an inclined guide plane.

15. The antistatic structure according to claim 9, wherein said protrusion is slightly interfered with the rim of said lower cover.

* * * * *